Figure 2:
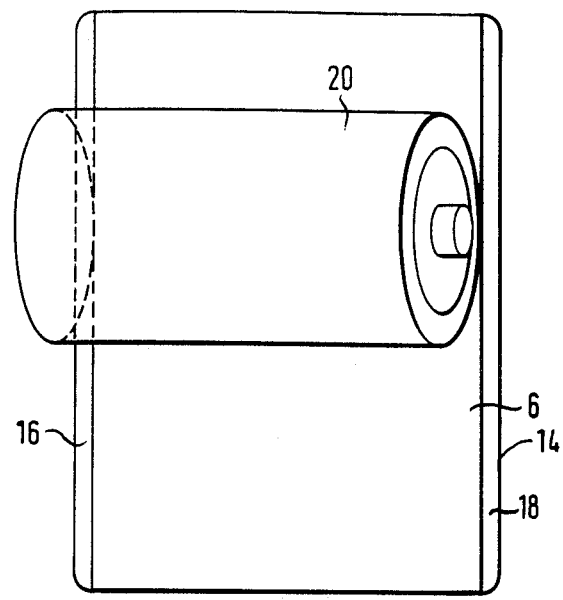

United States Patent [19]

Will et al.

[11] Patent Number: 4,801,514
[45] Date of Patent: Jan. 31, 1989

[54] MULTILAYER ADHESIVE LABEL

[75] Inventors: Rolf Will, Bad Toelz; Hans-Peter Ast, Holzkirchen, both of Fed. Rep. of Germany

[73] Assignee: Zweckform Etikettiertechnik GmbH, Holzkirchen, Fed. Rep. of Germany

[21] Appl. No.: 70,642

[22] Filed: Jul. 2, 1987

Related U.S. Application Data

[63] Continuation of Ser. No. 739,376, May 30, 1985, abandoned.

[30] Foreign Application Priority Data

Aug. 16, 1984 [DE] Fed. Rep. of Germany ....... 3430162

[51] Int. Cl.$^4$ .............................................. H01M 2/02
[52] U.S. Cl. .................................... 429/167; 428/354; 428/910; 40/299
[58] Field of Search ................. 428/77, 136, 354, 910; 40/2 R, 306, 310; 429/175, 167

[56] References Cited

U.S. PATENT DOCUMENTS

| | | | |
|---|---|---|---|
| 3,542,229 | 11/1970 | Beyerlein | 215/1 |
| 3,547,752 | 12/1970 | Janssen | |
| 3,927,484 | 12/1975 | Spiegel et al. | 40/307 |
| 4,190,168 | 2/1980 | Jacques | 215/12 R |
| 4,273,816 | 6/1981 | Tollette | 428/354 X |
| 4,287,274 | 9/1981 | Ibbotson et al. | 428/343 X |
| 4,421,816 | 12/1983 | Arnold | 428/202 |
| 4,608,323 | 8/1986 | Zaborney | 429/167 |

FOREIGN PATENT DOCUMENTS

| | | |
|---|---|---|
| 59-123160 | 7/1984 | Japan . |
| 59-138052 | 8/1984 | Japan . |
| 158067 | 9/1984 | Japan . |

OTHER PUBLICATIONS

H. P. Ast, Geeignet Besonders für Kunstoff [Particularly Suitable for Plastics Material], Publication: Packung & Transport, vol. 1, 1/1984, pp. 17–21.

Primary Examiner—Alexander S. Thomas
Attorney, Agent, or Firm—Toren, McGeady & Associates

[57] ABSTRACT

Multilayer adhesive label which is shrinkable on a circumferential surface of a body, particularly of a dry-cell battery, including a carrier layer for a outwardly visible imprint which is covered with a transparent protective layer, whose outermost layer is formed by means of an at least axially stretched, transparent laminated foil of shrinkable plastics material. The carrier layer may have at least one cut in the vicinity ofits edge extending along the generating line of the circumferential surface of the body.

1 Claim, 3 Drawing Sheets

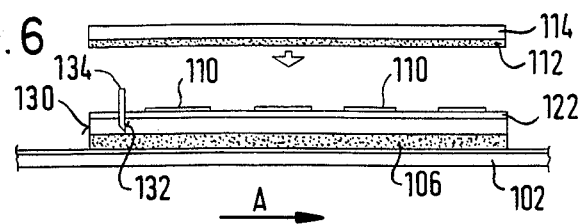
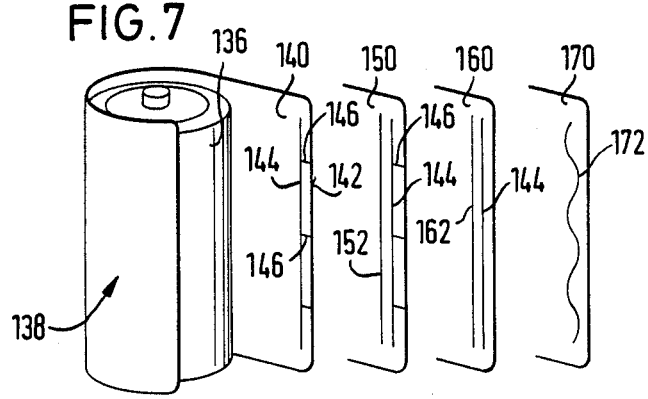
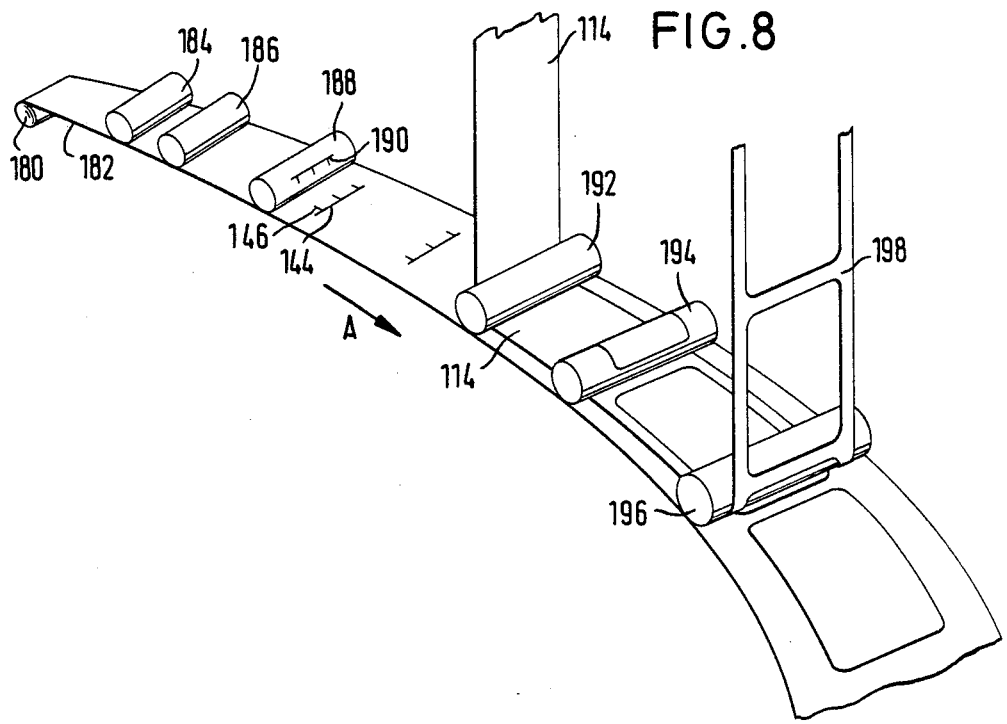

MULTILAYER ADHESIVE LABEL

This is a continuation, of application Ser. No. 739,376, filed May 30, 1985 now abandoned.

The invention is directed to a multilayer adhesive label which is shrinkable on the circumferential surface of a body, particularly a dry-cell battery.

In known labels of this type the carrier layer is composed of stretched, shrinkable plastics material. The protective layer of the imprint consists of a glossy lacquer. Such a protective layer of lacquer cannot always sufficiently protect the imprint located beneath it; neither can a vapor deposited layer on which the imprint is printed under the control of a layer. Particularly when there are extensive mechanical stresses, for example, in a battery chamber, damage may even occasionally occur which leads to a discharging of the battery.

It is the object of the invention to provide an adhesive label which better protects the imprint and the layers located beneath the latter.

In accordance with the present invention, the foil of shrinkable plastics material assumes the protective function and the imprint is mounted on the carrier.. This other foil can be provided in addition to the known foil of shrinkable plastics material which is located in the adhesive label. But it can also assume its function. In the latter case the carrier, which would otherwise have the function of the shrinkable plastics material foil, is composed of paper or hard polyvinyl chloride (HPVC), so that the label is substantially less expensive.

A particularly extensive cover of the body with the adhesive label is obtained when the foil projects axially beyond the carrier.

In order to be able to remove the carrier from a backing easily and in order to easily glue the adhesive label on a body, a preferable construction is provided according to claim 4 by a contact adhesive layer placed on the back of the carrier.

The adhesive label is constructed in a particularly simple embodiment which meets the object of the invention by a layer of aluminum vapor deposited on the carrier.

Adhesive labels are often applied to a body in such a way that their edges which extend along a generating line of the circumferential surface of the body, overlap. It has been shown that, after some hours, the border area closest to the edge lying outside can lift off, depending on the inherent rigidity of the label and on the resiliency of the label resulting from it, particularly after the shrinkage.

It is another object of the invention to prevent the edge lying outside and extending along the generating line of the circumferential surface of the body and the border area adjoining it from lifting off in the manner described above.

The solution of this object is provided by a cut in the outside edge portion of the label.

The cut to be provided according to the invention breaks the inherent rigidity, and, therefore, the resiliency, in the critical area. On the other hand, however, the cut is not visible from the outside when it extends only through the carrier layer and possibly through the imprint.

Cuts which have been shown to be particularly favorable are serpentine or straight in shape and may have branches extending to the edge.

The invention will be explained in the following with the aid of embodiment examples and with reference to the attached drawings.

Figure 1:
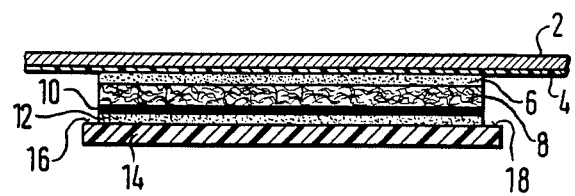
Figure 3:
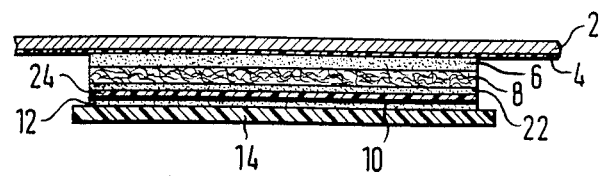
Figure 4:
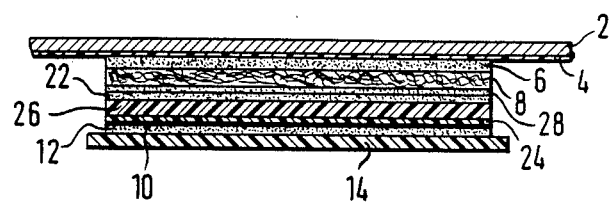
Figure 5:
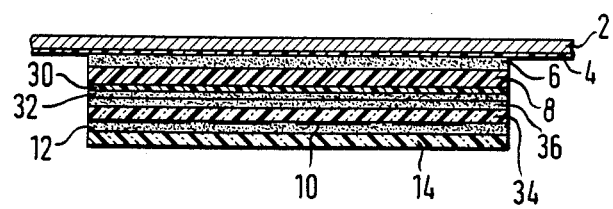

FIG. 1 shows a first embodiment form of an adhesive label in cross-section,

FIG. 2 schematically shows the application, known per se, of such an adhesive label on the body of a dry-cell battery, FIG. 3 shows a second embodiment form of an adhesive label in cross-section, FIG. 4 shows a third embodiment form of an adhesive label in cross-section, FIG. 5 shows a fourth embodiment form of an adhesive label in cross-section, FIG. 6 shows an adhesive label provided with a cut in cross-section, FIG. 7 shows various cuts, and FIG. 8 shows a method for producing the adhesive label with the cut.

The adhesive label according to FIG. 1 is placed on a base 2 which is provided with an adhesive repellent layer 4, for example of silicone. A carrier 8 composed of paper which is provided underneath with a contact adhesive layer 6, is detachably arranged on the adhesive repellent layer 4. An imprint 10, which is shown only schematically, is applied to the outside of the carrier 8. The surface which is provided with the imprint 10 is covered by a foil 14 of stretched, shrinkable plastics material provided on the back with a laminated adhesive layer 12. This foil 14 projects at both borders 16, 18 over the layers 6, 8, 10, 12 lying below it. The label is formed by means of the layers 6, 8, 10, 12, 14 and is detached before being applied to a battery body 20 (FIG. 2) on the base 2,4. The axial dimensions of the battery body 20 conform to dimensions of the layers 6, 8, 10, 12 of the label according to FIG. 1. The label is now applied in such a way that the foil 14 of shrinkable plastics material lies on the outside and the layer 6 is glued to the dry-cell battery body 20. When the label is glued on around the body 20 of the dry-cell battery, the label is subjected, along with the body 20, to a thermal effect as a result of which the foil 14 shrinks and, by means of this, the projecting borders 16, 18 firmly attach to the border area of the front faces of the body 20.

The label according to FIG. 3 is constructed in a similar manner as that according to FIG. 1, but is provided with additional layers. The layers corresponding to those according to FIG. 1 are provided with the same reference numerals as the corresponding layers in FIG. 1. In contrast to the embodiment according to FIG. 1, the imprint 10 is not located on the carrier 8. Rather, the carrier 8 is provided with a vapor deposited layer 22 which carries a primer layer 24 on the outside for the imprint 10. The vapor deposited layer lends the body a metallic appearance from the outside and forms a good contrast for the imprint 10.

With respect to the reference numerals, the same applies to FIG. 4 as to FIG. 3. But in this case a foil layer 26 is applied to the outer surface of the carrier 8, which foil layer 26 is provided on the back with the vapor deposited layer 22 and a laminated adhesive layer 28 located on its rear side Foil layer 26 is of polypropylene (PP) and preferably 15–30 $\mu$m thick or polyethylene terephthalate (PETP) and preferably 10–15 $\mu$m thick.. This label according to FIG. 4 is distinguished by its particularly high resistability and particularly good insulation characteristics.

In the embodiment according to FIG. 5, a vapor deposited layer 32 of aluminum is placed on the carrier 8 of plastics material through the intermediary of a primer layer 30, and a transparent plastics material foil 34 of hard polyvinyl chloride (HPVC) provided on the outside with an imprint 10, is placed on the vapor deposited layer 32 through the intermediary of a laminated adhesive layer 36. A transparent foil 4 is placed on the imprint 10 by means of a laminated adhesive layer 12. Foil 14 is of hard polyvinyl chloride (HPVC) and has a thickness of 10–15 μm. The foils 8, 34 and 14 can be stretched, particularly in the same direction in the circumferential direction. In the case of FIG. 5, the foil 14 does not project in the circumferential direction, in contrast to the embodiment examples according to FIGS. 1, 3 and 4.

The adhesive label acccording to FIG. 6 is detachably applied to a base 102 with an adhesive repellent layer 104, particularly of silicone. It consists of a carrier layer 108 which is provided underneath with a contact adhesive layer 106 and carries a vapor deposited layer 122 on topon which an imprint 110 is located. The imprint is covered by a laminated foil 114 whose underside is provided with a laminating adhesive layer 112.

The base 112 has the form of a belt which runs in the direction of arrow A during the production of the labels and during the detaching of the labels for applying to the body to be labeled.

Closest to its downstream edge 130, the vapor deposited layer 122 and the carrier layer 108 are provided with a cut 132 to be produced by means of a cutting knife 134.

FIG. 7 shows a dry-cell battery 136 around which is placed a label 138; only the border area 140 projects away. Located closest to the edge 142 of the border area 140 is a straight cut 144 with branches 146 extending to the edge 142. To the right of this is an embodiment of a border area 150 of a label which has a second straight cut 152 inside next to the straight cut 144 and the branches 146.

To the right of the latter is a border area 160 having two straight cuts 144 and 162.

To the right of the latter is a border area 170 having a serpentine cut 172.

FIG. 8 shows a layer composite 182 drawn off of a roller 180 and comprising layers 102, 104, 106, 108 and 122, according to FIG. 6.

This layer composite is provided on top with an imprint by means of two printing rollers 184 and 186, which imprint corresponds to the imprint 110 according to FIG. 6. Next the layer arrives under a cutting roller 188 with a cutting knife 190 which produces the cuts 144 and 146 according to FIG. 7. Thereupon, the laminated foil 114, which is provided on its underside with a laminated adhesive layer 112, is applied, by means of a deflecting roller 192, to the layer composite provided with the imprint and the cut. The labels are cut out of the composite produced in this manner with a label cutter 194. The matrix 198 remaining around the cut out labels is pulled off with a subsequent roller 196.

We claim:

1. Multilayer adhesive label glued onto a circumferential surface of a dry-cell battery body, the body having an axis and top and bottom end faces, wherein the label comprises:
    (a) a bottom layer of hard polyvinyl chloride foil stretched in circumferential direction of the body, an adhesive layer on the bottom side of the bottom layer glued onto the circumferential surface, the top side of the bottom layer covered with a vapor deposited layer of aluminum,
    (b) an intermediate layer of hard polyvinyl chloride foil stretched in circumferential direction of the body, an adhesive layer on the bottom side of the intermediate layer glued onto the vapor deposited layer, and an imprint on the top side of the intermediate layer,
    (c) a top layer of hard polyvinyl chloride foil stretched in circumferential direction of the body, an adhesive layer on the bottom side of the top layer glued onto the top side of the intermediate layer and the imprint,
    wherein the bottom layer, the intermediate layer and the top layer of hard polyvinyl chloride foil are shrinkable, and wherein the label defines edge portions which extend axially beyond the end faces of the body, the end portions being shrunk onto the end faces and the adhesive layer on the bottom of the bottom layer being glued onto the end faces.

* * * * *